United States Patent
Rogers

(10) Patent No.: US 8,505,057 B2
(45) Date of Patent: Aug. 6, 2013

(54) DEMAND-BASED EDGE CACHING VIDEO CONTENT SYSTEM AND METHOD

(75) Inventor: Thomas J. Rogers, Sellersville, PA (US)

(73) Assignee: Concurrent Computers, Duluth, GA (US)

( * ) Notice: Subject to any disclaimer, the term of this patent is extended or adjusted under 35 U.S.C. 154(b) by 136 days.

(21) Appl. No.: 12/897,985

(22) Filed: Oct. 5, 2010

(65) Prior Publication Data

US 2012/0084821 A1 Apr. 5, 2012

(51) Int. Cl.
*H04N 7/173* (2011.01)

(52) U.S. Cl.
USPC ............ 725/87; 725/91; 725/92; 725/93; 709/217

(58) Field of Classification Search
USPC ............................ 725/87, 91–93; 709/217
See application file for complete search history.

(56) References Cited

U.S. PATENT DOCUMENTS

| | | |
|---|---|---|
| 6,205,525 B1 | 3/2001 | Korst |
| 2002/0083148 A1 | 6/2002 | Shaw et al. |
| 2002/0131428 A1 | 9/2002 | Pecus et al. |
| 2002/0152318 A1* | 10/2002 | Menon et al. ............ 709/231 |
| 2003/0174648 A1 | 9/2003 | Wang et al. |
| 2004/0249965 A1 | 12/2004 | Huggins et al. |
| 2004/0255323 A1 | 12/2004 | Varadarajan et al. |
| 2005/0005000 A1 | 1/2005 | Yoshimoto |
| 2006/0294555 A1 | 12/2006 | Xie |
| 2007/0283397 A1 | 12/2007 | Scholl |
| 2008/0059631 A1 | 3/2008 | Bergstrom et al. |
| 2009/0070533 A1 | 3/2009 | Elazary et al. |
| 2009/0083279 A1 | 3/2009 | Hasek |
| 2009/0144417 A1 | 6/2009 | Kisel et al. |
| 2009/0328090 A1 | 12/2009 | Randolph et al. |
| 2010/0058405 A1 | 3/2010 | Ramakrishnan et al. |

FOREIGN PATENT DOCUMENTS

| | | |
|---|---|---|
| EP | 1269714 | 1/2003 |
| WO | WO-03/044667 | 5/2003 |
| WO | WO-03/103292 | 12/2003 |
| WO | WO-2007/048526 | 5/2007 |
| WO | WO-2009/014593 | 1/2009 |

* cited by examiner

*Primary Examiner* — Kunal Langhnoja
(74) *Attorney, Agent, or Firm* — Philip H. Burrus, IV

(57) ABSTRACT

A method (300) and system (200) for of conserving resources in a video-on-demand environment are provided. The method (300) includes storing a stub file (223) on an edge storage device while storing content (110) at a central storage device (222). When a video-on-demand request (440) is received, a resource management system (206) reads (305) the stub file (223) to determine a storage location at the central storage device (222). The resource management system (206) then retrieves the content (110) from the storage location determined from the stub file (223) and either stores it at an edge storage device (111) or delivers it the a subscriber device (109) to fulfill the video-on-demand request (440).

18 Claims, 5 Drawing Sheets

DEMAND-BASED EDGE CACHING VIDEO CONTENT SYSTEM AND METHOD

BACKGROUND

1. Technical Field

This invention relates generally to a video-on-demand system, and more particularly to a caching system and method for a video-on-demand system.

2. Background Art

Video-on-demand is becoming increasingly popular. With video-on-demand, a consumer can choose not only the content they wish to see, but also the viewing time as well. When a person orders a video-on-demand session, the selected content is delivered from a server to a receiving unit at the person's location, which is frequently a set-top box.

One issue associated with video-on-demand systems involves heavy resource allocation. Servers must be configured to store vast amounts of content. Further, networks must be able to accommodate large volumes of content data.

It would be advantageous to develop a system or method capable of providing video-on-demand functionality with reduced demand on available resources.

Figure 1:
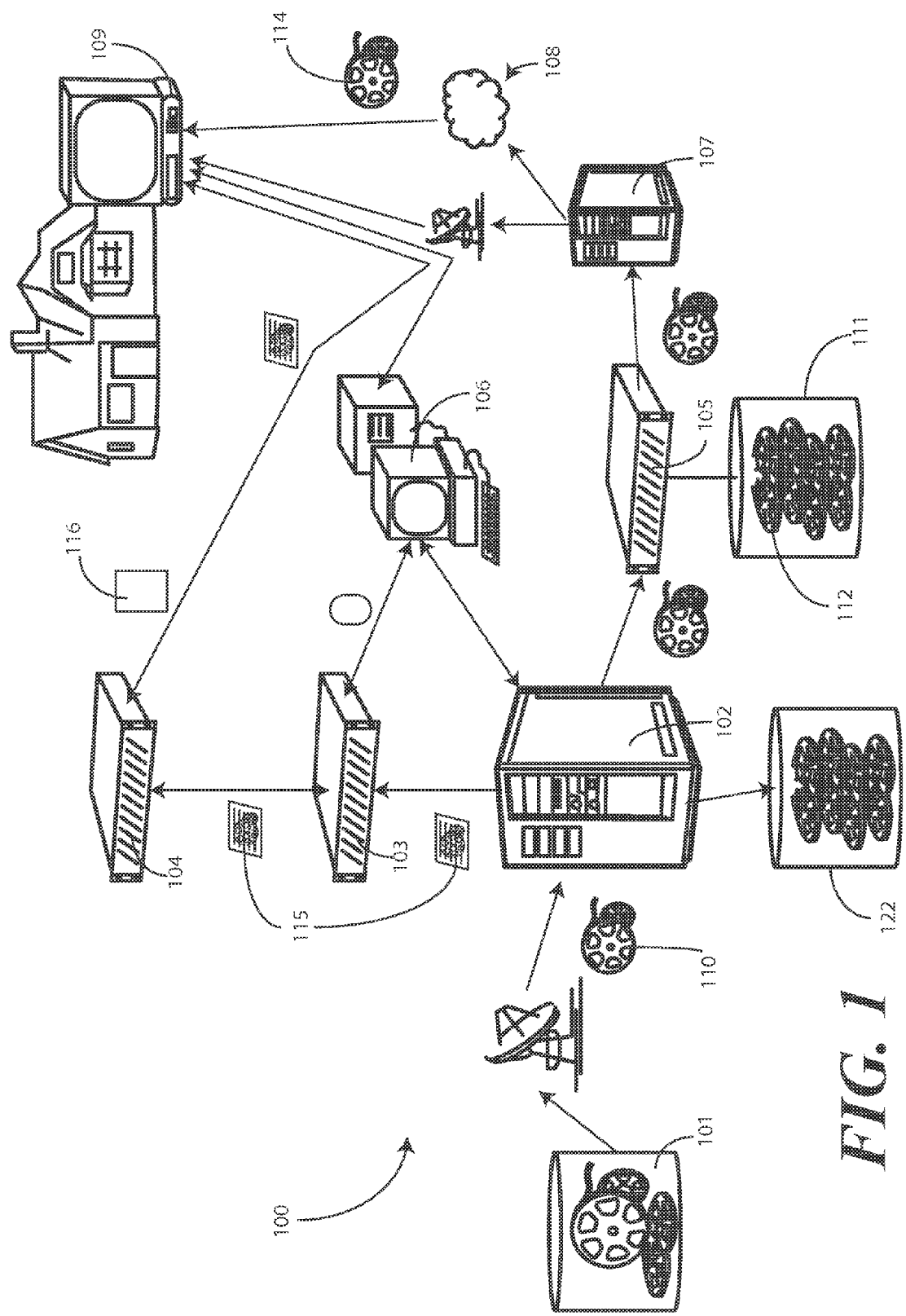
FIG. 1 illustrates one or more embodiments of a video-on-demand system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to caching content on local servers in a video-on-demand system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of edge caching described herein. The non-processor circuits may include, but are not limited to, network communication devices, routers, switches, video compression and decompression engines, and user video-on-demand devices. As such, these functions may be interpreted as steps of a method to perform edge caching as described herein. It is expected that one of ordinary skill, notwithstanding possibly significant effort and many design choices motivated by, for example, available time, current technology, and economic considerations, when guided by the concepts and principles disclosed herein will be readily capable of generating such systems and methods with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments described below provide a method and system for dynamically caching content, such as video-on-demand content, between a central storage device and a local storage device. In one embodiment, when content is received from a content provider, it is stored on a central server only, rather than being stored on a plurality of local, edge servers. A stub file, which may include information about where the content is stored on the central server, is then created by a central content management system and stored on the local, edge servers. The stub file is generally significantly smaller in size than is the content file. Accordingly, the stub file can be stored on the local, edge servers with less storage space than the content file. Further, less communication network resources are consumed when the stub file is delivered from the content management system to the local management system.

When a person requests content represented on the local, edge server by a stub file in a video-on-demand session, the local management system detects that the stub file—as opposed to actual content—is locally stored. The local management system then reads the stub file to determine the location where the content is stored within the central system. The local management system then retrieves the content according to the location and/or retrieval instructions read from the stub file. The content is then delivered to the subscriber.

Embodiments described below address the challenges of providing more efficient delivery of content in heterogeneous video-on-demand systems. Embodiments described below employ a central server or content storage unit to store content, while distributing reduced size stub files to edge servers that are disposed locally with one or more streaming servers configured to deliver content to customers, clients, and other users. The actual content is delivered to the edge servers only upon demand, or in some embodiments, when demand exceeds a predetermined threshold, thereby conserving edge server storage resources and communication network bandwidth in contrast to prior art systems that store all content on each of the edge servers. Embodiments described below not only more efficiently deliver content, but are configured to operate with legacy on-demand system components as well.

Turning now to FIG. 1, illustrated therein is a base on-demand system 100 configured with video-on-demand functionality. The base on-demand system 100 of FIG. 1 stores content 110 on a local storage device 111 proximately located with an edge server 105. The stored content 112 is then delivered to the requestor of a video-on-demand session by way of a streaming server 107.

When new content is ready for delivery, a content provider 101 delivers the content 110 to a content management system 102. The content 110 can comprise any type of data, but for ease of illustration will be referred to as video content, as well as associated audio content, metadata, or other content, suitable for use in a video-on-demand session. By way of example, the content can be digitally compressed video content that can be demultiplexed and stored in a convenient format such as MPEG, MPEG 2, or MPEG 4. It will be clear to those of ordinary skill in the art having the benefit of this disclosure that other types of content could be used with the systems, methods, and devices described herein. The content provider 101 can provide the content 110 in various formats. For example, the system may receive radio-frequency signals by satellite 113 or data packets by land-based communication networks.

The content management system 102 manages the storage of the content 110 across the system 100. For example, the content management system 102 can store the content 110 in a local repository 122. The content management system 102 is also operable with one or more edge servers 105 and edge storage devices 111. Accordingly, the content management system 102 can arrange the storage of content 110 on the edge storage device 111 by replicating the content 110 stored in the local repository 122 in the edge storage device 111. The content management system 102 is further configured to prepare and ingest the received content 110 for storage.

The edge server 105, in one embodiment, is a device capable of storing quantities of data, including but not limited to video content and other types of content. In one embodiment, the edge server 105 is operable with a streaming server 107 to deliver content 114 in the form of video and audio an interactive network 108 upon the request of a subscriber device 109, which may be a set-top box, computer, multimedia player, and other devices configured to specify desired content and/or to receive the video content for viewing.

A back office system 103 is operable with the content management system 102. The back-office system 103, in one embodiment, contains pertinent information required for typical system operation. This information can include subscriber information and identifiers, subscriber device information and identifiers, metadata 115 corresponding to the content, and so forth. In some embodiments, the back office system 103 is configured to provide resource management and resource allocation throughout the system 100. In one embodiment, the back office system 103 locally stores definitions for the content 110 and the metadata 115. The back office system 103 can be configured to have knowledge of content storage locations across the system 100.

The metadata 115 generally comprises identification information corresponding to the content 110, without including the content itself. By way of example, metadata 115 can include content file size, content title, a summary of the content, and so forth. Where the content 110 is video content, such as a movie, the metadata 115 can include information such as the names of the actors, the rating, and type of content. Additional information can be added to the metadata 115, such as pricing, time of availability, packaging, and other identifying information.

The back office system 103 is operable with a menu management system 104. The menu management system 104 is configured to generate a menu 116 or other on-demand navigational catalog for delivery to the subscriber device 109. The menu 116 provides the information necessary for the subscriber to determine what content is available, as well as other menu-based experiences provided by the subscriber device 109. The menu 116 can be generated in real time or in bulk format. Further, the menu 116 can be used in interactive systems or in more bulk-oriented menu presentation systems as well.

The menu management system 104 works with the back office system 103 to define one or more lists of content titles that are available to the subscriber device 109. In one embodiment, the menu management system 104 can use metadata 115 to build the menu 116. For example, in one embodiment the menu management system 104 is configured to read the metadata 115 and add at least a portion of the metadata 115 to the menu 116 before the content is stored on the edge server. The back office system 103 can be configured to deliver the metadata 115 to the menu management system 104 so that all of the titles known to the back office system 103 can be included in the menu 116 regardless of where they are stored.

A resource management system 106 is operable with the back office system 103 and the content management system 102. In one embodiment, the resource management system 106 is configured to allocate or otherwise manage system resources for the distribution of content 110 on the side of the system 100 that is proximately located with the subscriber device 109. For example, the back office system 103 can communicate with the resource management system 106 when video-on-demand sessions commence so that the resource management system 106 can allocate and control the necessary resources. The resource management system 106 can use information from the back office system 103 to determine resource allocations based upon subscriber demand or other criteria.

When the content provider 101 delivers the content 110, the content management system 102 ingests the content 110. As noted above, the content management system 102 causes the content 110 to be stored as stored content 112 on the edge storage device 111. Once the content 110 has been processed and stored, the content management system 102 either creates or pulls metadata 115 for the content 110 and delivers it to the back office system 103. When the back office system 103 receives the metadata 115, in one embodiment it determines the title of the content 110 and marks the title as "available for viewing" by subscribers.

The back office system 103 then makes the metadata 115 available to the menu management system 104. As described above, the menu management system 104 uses the information contained in the metadata 115 to construct the menu 116. The menu 116 enables subscribers to view the list of available titles on the subscriber device 109.

In one embodiment, the back office system 103 is configured to communicate with the resource management system 106 as well. For instance, as described above the back office system 103 can be configured to be operable with the resource management system 106 to control resources and/or to determine resource allocation based on measured viewing measurements.

When a subscriber initiates a video-on-demand session with the subscriber device 109, information indicating that the video-on-demand session has begun is delivered to the back office system 103. The back office system 103 accordingly accesses the locally stored catalog to determine the storage location of the stored content 112. The back office system 103 then causes the stored content 112 to be delivered as streamed content 114. This process occurs in one embodiment via the streaming server 107. In response to instructions from the back office system 103, the streaming server transfers the streamed content 114 to the subscriber device 109.

Figure 2:
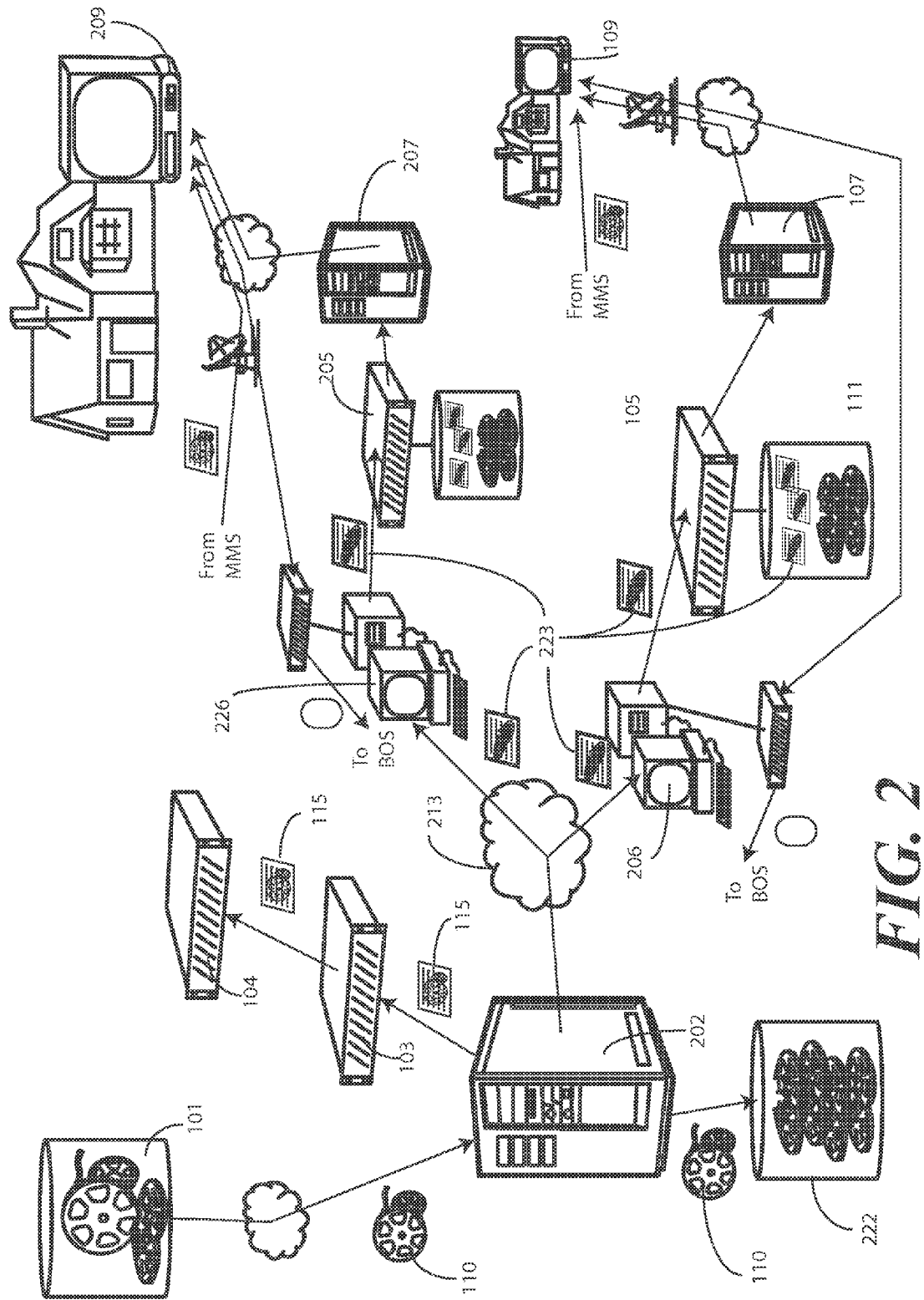
FIG. 2 illustrates one or more embodiments of a video-on-demand system employing a demand-based edge caching system employing a stub file.

Turning now to FIG. 2, illustrated therein is a video-on-demand system 200 employing edge caching to more efficiently deliver content 110 to a subscriber device 109 in accordance with one or more embodiments. Illustrating the ease with which the embodiments may be integrated into the base system, many of the components of FIG. 2 are the same as in FIG. 1, including the back office system 103, the menu management system 104, the edge servers 105,205, the edge storage devices 111,211, the streaming servers 107,207, and the subscriber devices 109,209. Note that while a single edge server (105) was shown in FIG. 1, two edge servers 105,205 are shown in FIG. 2 so that various embodiments can be more fully described. The edge servers 105,205 and resource managers 206,226 are disposed distally across a network 213 from the content management system 202 so as to more efficiently deliver data to the subscriber devices 109,209.

The components of the system 200 shown in FIG. 2 work together to provide the back office system 103 an awareness and understanding of content availability that appears, at least to the back office system 103, as being stored at the edge servers 105,205 even though the content 110 actually resides elsewhere. Said differently, methods and systems described below work to "trick" the back office system 103 into thinking the content 110 is stored on the edge storage devices 111,211 when the content 110 is actually stored on a central storage device 222. Accordingly, a legacy back end system can be used with the methods described herein.

The content 110 can be transferred from the central storage device 222 to the appropriate edge storage device when requested by a subscriber as set forth below. Alternate triggers can be used for transferring the content 110 to the edge storage devices 111,211, such as when subscriber demand reaches a certain predetermined threshold. Embodiments provide this functionality without changes to the back office system 103 or the menu management system 104. Further, the functionality can be provided without changes to existing video-on-demand session management protocols.

In one embodiment, the transfer of the content 110 from the central storage device 222 to the edge storage devices 111, 211 is delayed until absolutely necessary. This can be done to conserve storage space on the edge storage devices 111,211, to conserve communication network bandwidth, or combinations thereof.

Embodiments described herein employ a stub file 223 to trick the back office system 103 into thinking that the content 110 is stored on the edge storage devices 111,211 when it is really stored at another location. While embodiments of a stub file 223 will be described in more detail in the discussion of FIG. 5, for the purposes of understanding the embodiments shown in FIG. 2, it is sufficient to consider the stub file 223 to be a file that serves as a temporary placeholder for the content 110 and includes at least a storage location where the content 110 resides. By using stub files 223, commonly used or requested content files to be cached in edge storage device 111,211, while more infrequently used or requested content files may be stored in the central storage device 222 until requested. In some instances, the use of a stub file 223 may be prohibited. In such applications, the content management system 202 can check to determine whether restrictions established in the system prevent the creating or use of stub files. Where this is the case, the process proceeds as described in FIG. 1.

Where stub files are permitted, the content management system 202 is configured to perform a "slight-of-hand" trick with respect to the back office system 103 when ingesting the content 110. When a content provider 101 or other external source delivers the content 110 to the content management system 202, the content management system 202 functions as a content receiver. Upon receiving the content 110, the content management system 202 stores the content 110 on the central storage device 222.

The content management system 202 is then configured to create a stub file 223 for the content 110. In one embodiment, the stub file 223 comprises metadata for the content 110, such as metadata 115 or other metadata. The stub file 223 further includes a storage location for the content 110 on the central storage device 222. In one embodiment, the storage location comprises a memory location within the central storage device 222. The content management system 202 then causes the stub file 223 to be stored at the edge servers 105,205, such as within the edge storage devices 111,211 by delivering the stub file 223 to the edge servers 105,205.

The back office system 103 functions as a system resource manager in the system 200 of FIG. 2. To perform its slight-of-hand, the content management system 202 delivers the metadata 115 to the back office system 103. Additionally, the resource management system 206,226 or content management system 202 can inform the back office system 103 that the content 110 is stored at the edge server 105,205 after only storing the stub file 223 at the edge server 105205. This delivery serves as a "trick" notification to the back office system 103 that the content 110 has been stored at the edge servers 105,205. However, in reality only the stub file 223 has been stored at the edge servers 105,205. The content 110 is stored in the central storage device 222. In one embodiment, the stub file 223 serves not only as a placeholder for content, but also provides a pointer to the content location within the central storage device 222 so that content 110 can be accessed when necessary.

The resource management systems 206,226 then function as edge resource managers in that they are configured to receive video-on-demand requests from subscriber devices 109,209. Further, as with FIG. 1, the resource management systems 206,226 are configured to communicate with the back office system 103 to control resources. The resource management systems 206,226 are thus configured to notify the back office system 103 when video-on-demand requests are received. These systems then work together to determine resource allocation and where content needs to be located based on detected viewing measurements. At this point in the process, the resource management systems 206,226 are unaware that stub files 223 have been stored on the local storage devices 111,211.

To accommodate the usage of stub files 223, in one embodiment the resource management systems 206,226 are configured to recognize the stub files 223 as non-content files. Further, the resource management systems 206,226 are configured to ingest the stub files 223 by reading the stub files 223 to determine at least the storage location of the content 110. For example, the resource management systems 206,226 can be configured to read the stub file 223 and store within its own catalog the central storage location of the content 110, as well as to indicate to the content management system 202 or back office system 103 the successful ingest of content without actually ingesting of the content 110.

As with FIG. 1, the content management system 202 then delivers metadata 115 to the back office system 103. Accordingly, the back office system 103 marks the corresponding content title as available and ready for viewing. The back office system 103 then delivers the metadata 115 to the menu management system 104 as before. The menu management system 104 generates a menu based upon what titles are available.

At this point, the content 110 remains stored within the central storage device 222. A client device, e.g., subscriber device 109, then requests the content 110 with a video-on-demand initiation request. The corresponding resource management system 206 intercepts this video-on-demand initiation request and checks to see whether the content 110 is stored locally at the edge storage device 111. Since only a stub file 223 corresponding to the content 110 is stored locally, the resource management system 206 must obtain the content 110 to fulfill the video-on-demand request.

Accordingly, the corresponding resource management system 206 detects that a stub file 223, rather than content, is present and stored at the local storage device 111. The resource management system 206 is configured to understand this detection as a need to retrieve the actual content 110. Accordingly, the resource management system 206 reads the stub file 223 to determine the storage location of the content 110. In this illustrative embodiment, the content 110 is stored within the central storage device 222. However, it will be clear to those of ordinary skill in the art having the benefit of this disclosure that embodiments are not so limited. The content 110 could be stored in various locations disposed across a network from the edge server 105.

The resource management system 206 is then configured to retrieve the content 110 from the storage location read from the stub file 223. Where the content 110 is stored within the central storage device 222 and the location read from the stub file 223 comprises a memory location within the central storage device 222, the retrieval operation will comprise retrieving the content form the central storage device 222 by accessing the memory location. The resource management system 206 is then configured to store the content 110 at the edge server 105 within the edge storage device 111. Once the content 110 has been retrieved, it is then delivered to the subscriber device 109 to fulfill the video-on-demand session request. This occurs, in one embodiment, with the assistance of the streaming server 107.

In one embodiment, the content management system 202 is configured to embed tags into the metadata 115 when creating the stub file 223. The tags are configured as instructions and can include instructions to cache content where the content is centrally stored. The tags or instructions could be included with the original content 110, or could be inserted based on rules or a particular configuration within the content management system 202. In such an embodiment, the metadata 115 can be incorporated into the stub file 223 and sent to the resource management system 206.

The embodiment shown and described in FIG. 2 offers several advantages over prior art systems. First, as noted above, no refitting of the back office system 103 is required when stub files 223 are used. Second, it is typically the case that the back office system 103 and the edge server 105 or streaming server 107 are manufactured by different vendors. They may be independently maintained as well. The use of the stub file 223 does not affect the operation of either component, even where they operate in accordance with different protocols.

Figure 3:
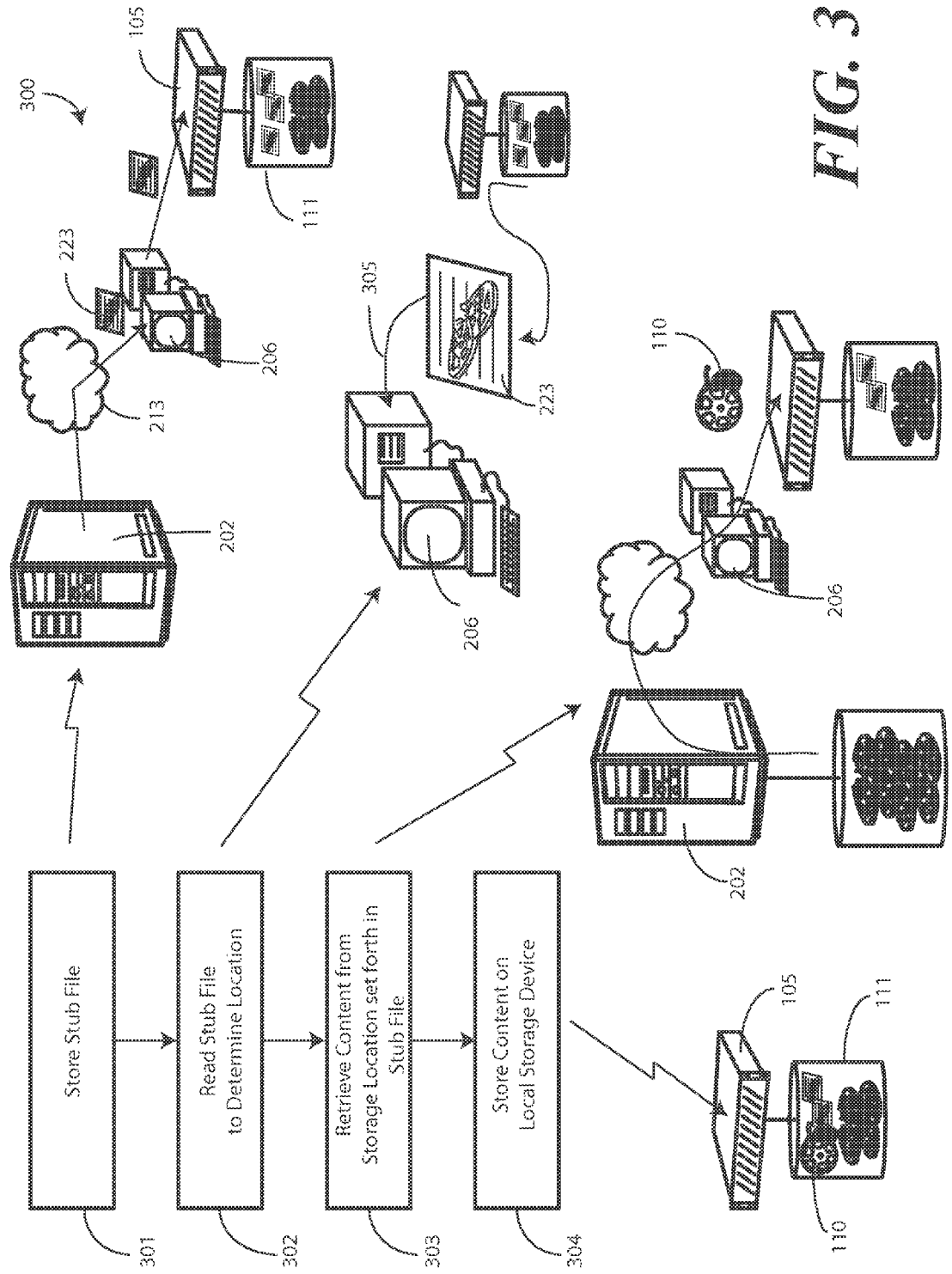
FIG. 3 illustrates one or more embodiments of a method for using demand-based edge caching in a video-on-demand system.

Turning now to FIG. 3, illustrated therein is a method 300 of conserving resources of an edge server 105 that is disposed across a network 213 from and is in communication with a content management system 202 configured to operate as a central server in accordance with one or more embodiments. At step 301, a stub file 223 is stored in an edge storage device 111. This storage step 301 can be at the direction of the content management system 202 or a resource management system 206 in communication with the edge server 105 or edge storage device 111. In one embodiment, the stub file 223 comprises metadata for the content and a storage location across the network 213 for the content.

At step 302, which occurs in response to receipt of a video-on-demand request from a subscriber device (109) in one or more embodiments, the resource management system 206 reads 305 the stub file 223 to determine the storage location. At step 303, the resource management system 206 retrieves the content 110 from the storage location read from the stub file 223. Alternatively, this step 303 can be performed at the direction of the content management system 202 in response to a request from the resource management system 206. At step 304, the content 110 is stored at the edge server 105. In one embodiment, this step 304 comprises storing the content in an edge storage device 111.

Figure 4:
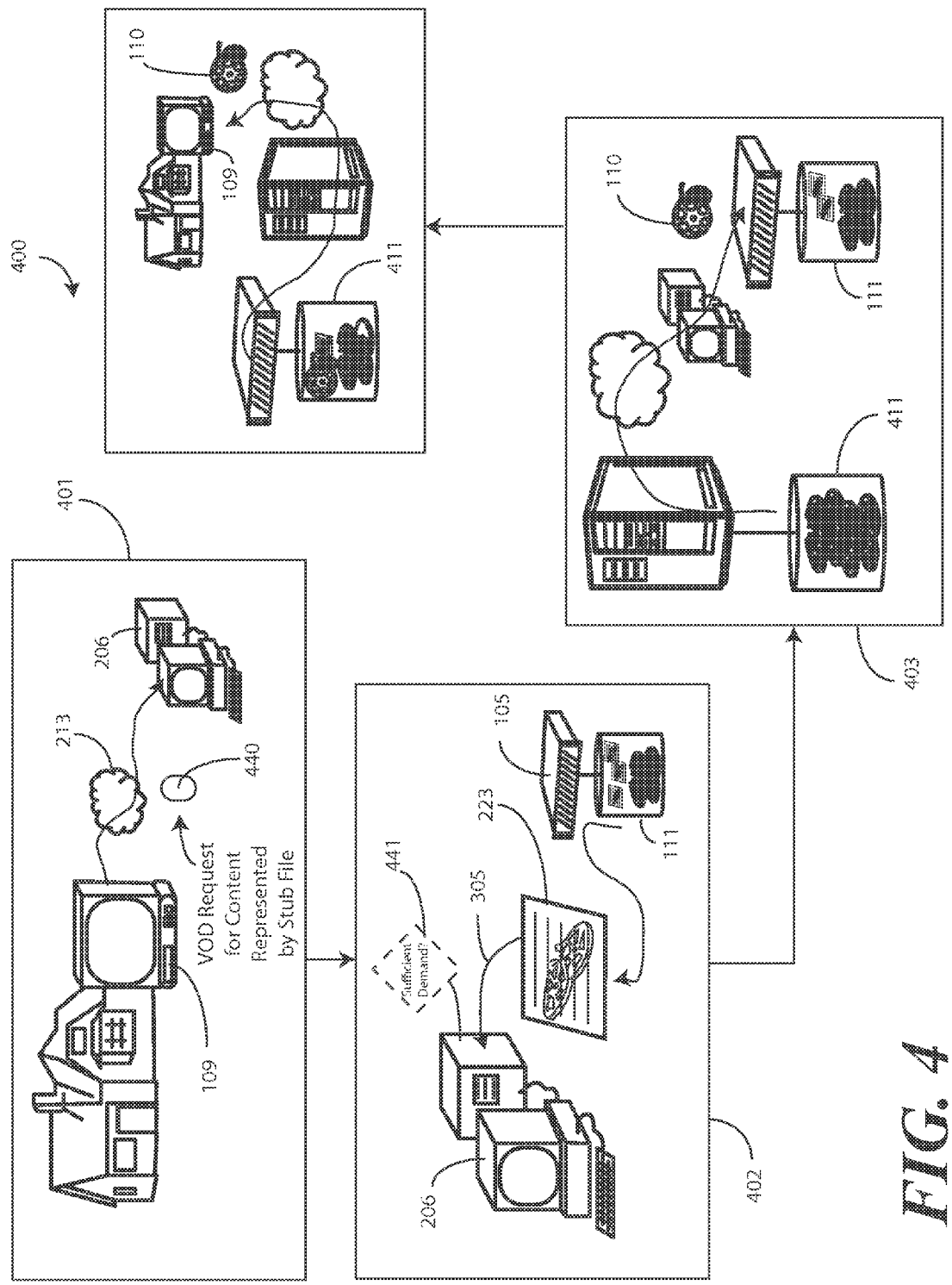
FIG. 4 graphically illustrates one or more embodiments of a video-on-demand session employing a method of using stub files in a demand-based edge caching.

Turning now to FIG. 4, illustrated therein is a graphical representation of a method for fulfilling a video-on-demand request 440 in a system comprising an edge server 105 disposed distally across a network 213 from, and in communication with, a central storage server 411. The method 400 of FIG. 4 serves to delay the delivery of content 110 from the central storage server 411 to the edge server 105 until either a video-on-demand request 440 is received or demand exceeds a predetermined threshold.

At step 401, a subscriber device 109 transmits a video-on-demand request 440. The video-on-demand request 440 is intercepted by a resource management system 206.

At step 402, in response to receiving the video-on-demand request 440, the resource management system 206 reads 305 a stub file 223 stored within an edge storage device 111 to determine storage location information for the content 110. It is well to note that where the video-on-demand request 440 is a rare request, the content 110 can be delivered from a central storage server 411 directly to the subscriber device 109. Accordingly, in one embodiment the content 110 is only moved from the central storage server 411 to the edge storage device 111 where demand exceeds a predetermined threshold, as indicated at decision 441.

At step 403, the content 110 is retrieved from the central storage server 411 in accordance with the storage location information determined from the stub file 223. Where the resource management system 206 comprises constituent parts, such as a resource manager and a content manager, these constituent parts can coordinate to perform caching of the centrally stored content 110 within the edge storage device 111. The content 110 can then be stored on the edge storage device 111. At step 404, the content 110 is delivered to the subscriber device 109 to fulfill the video-on-demand request 440.

Figure 5:
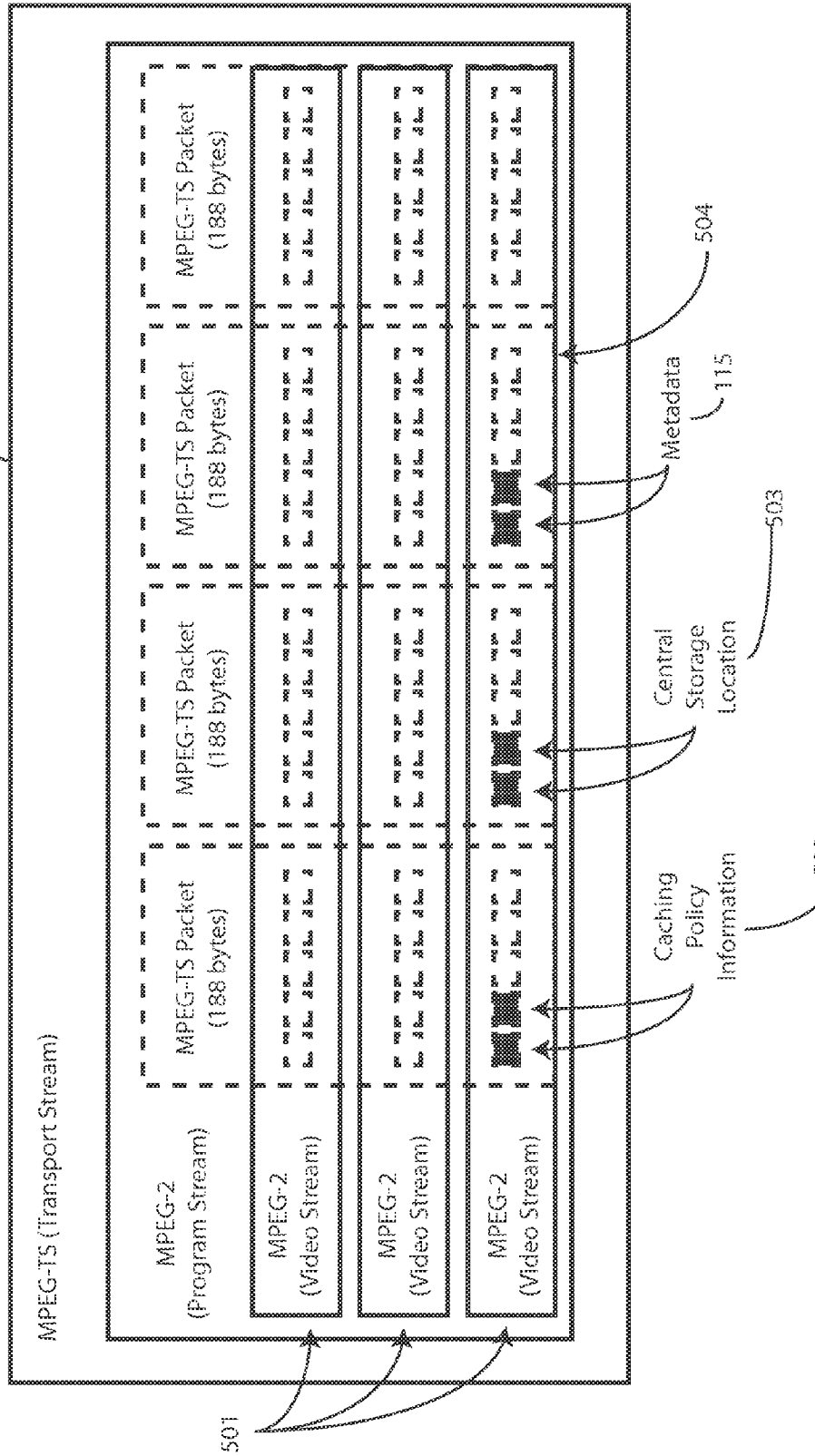
FIG. 5 illustrates one embodiment of a stub file suitable for use with one or more embodiments of the invention.

Turning now to FIG. 5, illustrated therein is one exemplary embodiment of a stub file 223 configured in accordance with one or more embodiments. As noted above, the stub file 223 can include metadata 115 corresponding to the content. While the inclusion of metadata 115 is optional, it can be advantageous in one or more embodiments to include it within the stub file 223. For example, the various system components may use information such as the license window expiration of the content or other content retention policies in the handling of content or stub files 223.

Other information can be included as well, as is described below. Note that any of a number of combinations and permutations of the various pieces of information can be used to construct stub files suitable for use with the systems described herein. This information can be encoded within the user or data areas 504 as set forth in applicable MPEG standards.

In one embodiment, a centralized content location 503 is encoded in the stub file 223. This centralized content location 503 can be the location of the actual, original content, as it exists in a centralized location, such as a library. The centralized content location 503 can be used the purpose of real-time edge caching without the need of a content location service.

In one embodiment, caching policy information 502 is encoded within the stub file 223. The caching policy information 502 may include information such as rules prohibiting edge caching in certain situations or rules governing the restriction of edge caching, such as the duration content may be cached, the number of cached copies that are allowed, and so forth.

While those of ordinary skill in the art having the benefit of this disclosure will readily understand the encoding procedures required to integrate the additional information into the stub file 223, a brief summary of the steps is provided here: Various MPEG standards employ data packets for transmitting audio, video, and other data, with each packet holding a finite amount of audio, video, or data. The packets each have some common features, such as a header, sync bytes, payload and based on their type can hold very different payloads. A MPEG content file is comprised of one or more streams 501, where each stream has a common set of bytes. For example, the typical MPEG file has one video stream and one or more audio streams. Some MPEG standards are configured not only hold audio and video, but can also hold digital data and information as well. It is this area that can be used for holding instructions, metadata, and rules like those described above.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method of conserving resources of an edge server disposed across a network and in communication with a central server, comprising:
   storing a stub file at the edge server, the stub file comprising metadata for content and a storage location for the content;
   informing a back office manager that the stub file is stored at the edge server, thereby causing the back office manager to perceive the content is stored at the edge server, when only the stub file is stored on the edge server and the content is stored on a server other than the edge server;
   marking, with the back office manager, that the content is ready for usage in response to the informing;
   receiving a demand for the content at a resource manager disposed across a network from the back office manger;
   in response to the receiving, reading, with the resource manager, the stub file to determine the storage location;
   retrieving, with the resource manager, the content from the storage location read from the stub file; and
   storing the content at the edge server.

2. The method of claim 1, wherein the storage location comprises a memory location at the central server, wherein the retrieving comprises retrieving the content from the central server.

3. The method of claim 1, further comprising:
   delivering retrieved content from the edge server to a streaming server to fulfill a video-on-demand session request.

4. The method of claim 1, further comprising:
   determining whether demand for the content exceeds a demand threshold;
   wherein the retrieving, and the storing occurs only where the demand for the content exceeds the demand threshold.

5. In a video-on-demand system comprising an edge server disposed distally across a network from, and in communication with, a central storage server, a method of delaying delivery of content from the central storage server to the edge server comprising:
   receiving the content from an external source;
   storing the content on the central storage server;
   creating a stub file;
   transmitting the stub file across the network and storing the stub file on the edge server;
   informing a back office system that the content is stored on the edge server after the storing the stub file on the edge server but prior to the storing the content at the edge server;
   receiving a video-on-demand session request for the content;
   in response to the receiving, reading, at the edge server, the stub file to determine storage location information for the content;
   retrieving the content in accordance with the storage location information determined from the stub file; and
   delivering the content to fulfill the video-on-demand session request.

6. The method of claim 5, further comprising storing the content at the edge server upon retrieving the content.

7. The method of claim 6, wherein the delivering comprises delivering the content from the edge server to a streaming server.

8. The method of claim 5, further comprising notifying the back office system of a video-on-demand session when the video-on-demand session request is received.

9. The method of claim 5, further comprising adding at least a portion of metadata corresponding to the content to a menu before the storing the content on the edge server.

10. The method of claim 6, wherein the stub file comprises metadata for the content and a storage location of the content.

11. The method of claim 10, wherein the storage location comprises a memory location of the central storage server.

12. The method of claim 5, further comprising determining whether restrictions established in the video-on-demand system prevent the creating of the stub file.

13. A video-on-demand system, comprising:
   a content receiver in communication with a central storage server, a back office system, and at least one edge server disposed distally across a network from the central storage server, wherein the content receiver is configured to:
   receive content from an external source; and
   upon receiving the content from the external source:

store the content on the central storage server;

deliver metadata corresponding to the content to the back office system;

generate a stub file comprising at least a portion of the metadata and a storage location on the central storage server for the content;

store the stub file on the at least one edge server; and send a notification to the back office system that the content is stored on the at least one edge server while the content is not stored on the at least one edge server.

14. The video-on-demand system of claim 13, further comprising an edge resource manager in communication with the central storage server and the at least one edge server, wherein the edge resource manager is configured to receive a video-on-demand session request, read the stub file to determine the storage location, retrieve the content from the storage location, and store the content on the at least one edge server.

15. The video-on-demand system of claim 14, wherein the edge resource manager is in communication with the back office system, wherein the edge resource manager is configured to notify the back office system that the video-on-demand session request is received.

16. The video-on-demand system of claim 14, further comprising a menu generator in communication with the back office system, wherein the menu generator is configured to add the metadata corresponding to the content to a menu after the stub file is stored on the at least one edge server but before the content is stored on the at least one edge server.

17. The video-on-demand system of claim 13, wherein the stub file comprises a location on the central storage server corresponding to the content.

18. The video-on-demand system of claim 17, wherein the stub file further comprises caching policy information, wherein the caching policy information comprises one or more of a time limit for caching, a file number limit for caching, or content restrictions on caching.

* * * * *